United States Patent

[11] 3,528,418

| [72] | Inventors | James R. Grosholz<br>Strafford, Pennsylvania;<br>Harry J. Lowe, Chicago, Illinois |
|---|---|---|
| [21] | Appl. No. | 650,940 |
| [22] | Filed | July 3, 1967 |
| [45] | Patented | Sept. 15, 1970 |
| [73] | Assignee | Air-Shields, Inc.<br>Hatboro, Pennsylvania<br>a corporation of Delaware |

[54] ANESTHETIC VAPORIZING APPARATUS
15 Claims, 17 Drawing Figs.

[52] U.S. Cl. .................................................. 128/188,
261/39, 261/124, 137/511, 287/86
[51] Int. Cl. .............................................. A61m 17/00
[50] Field of Search ................................... 128/188;
261/39, 124

[56] References Cited
UNITED STATES PATENTS
| 2,402,132 | 6/1946 | Goldberg | 261/124 |
|---|---|---|---|
| 2,553,446 | 5/1951 | Edmondson et al. | 128/188 |
| 2,687,741 | 8/1954 | Reading | 128/191X |
| 2,968,474 | 1/1961 | Eichelman et al. | 261/124X |
| 3,162,192 | 12/1964 | Gardner et al. | 128/188 |
| 3,351,057 | 11/1967 | Goodyear et al. | 128/188 |

Primary Examiner—Anton O. Oechsle
Assistant Examiner—Paul E. Shapiro
Attorney—Synnestvedt and Lechner

ABSTRACT: Apparatus is disclosed for the delivery of a constant mixture of anesthesia for vaporizing an anesthetic liquid and for maintaining a substantially constant ratio of vaporized anesthesia to diluent gas. This constant ratio is achieved by maintaining a substantially fixed relationship between the total pressure in the vaporizing vessel and the saturation partial pressure of the anesthetic liquid. A temperature responsive element in the vaporizing vessel controls the pressure regulator in the supply conduit for changing the total pressure in the vessel in accordance with the changes in temperature. Given a known concentration of vapor and means to control the pressure of the diluent gas, a constant volume percentage can be maintained.

Patented Sept. 15, 1970  3,528,418

INVENTORS
JAMES R. GROSHOLZ
HARRY J. LOWE
BY
Synnestvedt & Lechner
ATTORNEYS INVENTORS
JAMES R. GROSHOLZ
HARRY J. LOWE
BY
Synnestvedt & Lechner
ATTORNEYS

ANESTHETIC VAPORIZING APPARATUS

This invention relates to apparatus for supplying vaporized anesthetic liquid to be administered to a patient and is especially concerned with a method and apparatus providing for delivery of accurately controllable amounts of such anesthetic vapor.

Present techniques for vaporizing anesthetic liquids and for delivering to a patient a mixture of the vaporized anesthetic and gases such as oxygen, place heavy reliance on the ability of the anesthetist to sense and interpret his patients' response to a dose of anesthetic. The anesthetist must be able to quickly evaluate various reactions of the patient in order to estimate the depth of anesthesia and of the amount of anesthetic required to bring the patient to the proper level of unconsciousness. In making his evaluation, the anesthetist has heretofore had no really accurate beforehand knowledge of the amount of anesthetic administered. For a variety of reasons, equipment presently on the market does not have the capability of providing the operator of the equipment with knowledge of how much vapor is produced or delivered to a patient.

One consequence of the foregoing is that even the most skilled anesthetists may deliver more anesthetic to a patient to produce the required level of unconsciousness than is absolutely necessary. This is because the anesthetist can only determine the level of unconsciousness after the anesthetic has taken effect. If the required level is exceeded, pure oxygen or a much more diluted dosage of anesthetic is delivered until the anesthetist detects the necessary increase in the patient's physical responses. By this time, however, the patient may again be returning to consciousness, so that a large dose must again be administered. This procedure of alternately delivering greater or lesser doses of anesthetic may occur repeatedly during the course of an operation.

This manner of dosing a patient often results in giving him a much larger dose of anesthetic than is absolutely required and may have important detrimental physiological effects which, at the very least, add to his discomfort and delay his recovery after an operation. Moreover, it results in an unnecessary and costly waste of anesthetic liquid.

The present invention provides the anesthetist with a means for accurately measuring the amount of anesthetic delivered to the patient. Although the anesthetist must still use his considerable skills in evaluating the responses of the patient to the anesthetic, we have found that with the present invention, the dangers of over-dosing, as well as waste of the anesthetic vapor, can be considerably reduced.

The primary aim of the invention, therefore, is the provision of apparatus for delivering an accurately regulatable amount of vaporized anesthetic to a patient.

A related object of the invention is the provision of anesthetic vaporizing apparatus especially well suited for use in conjunction with closed circuit anesthetic administering equipment.

Still another object of the invention is the provision of anesthetic vaporizing apparatus which delivers preselected quantities of anesthetic vapor regardless of downstream breathing pressures, or of thermal or flow change effects.

A further object of the invention is the provision of safety features which permit operation of the equipment only when the proper operation procedures are followed; which automatically shut off the apparatus when the operating pressure levels are not reached and which prevent the accidental discharge of anesthetic liquid into the operating room.

According to the invention, a vaporizing vessel is filled with the anesthetic liquid to be vaporized. A supply of oxygen or other diluent gas under pressure is fed to the vaporizing vessel through a supply conduit which terminates in a gas distributor or diffuser submerged in the anesthetic liquid. The distributor or diffuser distributes tiny bubbles of gas into the liquid. These rise to the surface and escape from the vessel via an outlet near the top. As these bubbles pass to the surface of the anesthetic liquid, they pick up a certain percent of anesthetic depending upon the temperature and pressure within the vessel.

The difficulties involved in determining the amount of anesthetic actually being administered to a patient arise because the heat loss due to evaporation of the liquid and the resulting temperature drop is accompanied by a drop in the vapor pressure of the liquid. Because of the constantly changing vapor pressure, the amount of vapor actually delivered to the patient in any given time will, of course, vary significantly.

While this problem is present in the vaporization of all liquids, the problem is quite acute with the highly volatile liquids used for the administration of anesthesia.

Prior known approaches to the problem of regulating the dosage of anesthetic have been directed towards providing means for adjusting the flow or the concentration of vapor flowing from the vaporizer in accordance with changes in the vaporizing conditions, or in attempts to increase the flow of oxygen across the surface of a vaporizing liquid as the rate of evaporation drops. While approximate control of vapor mixture can be accomplished in existing equipment, the calibration of these mixtures is inherently inexact at low flow rates, such as may be required in closed circuit work. Breathing circuit pressure changes and comparatively inexact flow metering devices contribute other errors with the result that reasonably exact quantitative apportionment of anesthetic vapor is impossible to attain.

We have found that a substantially constant, predetermined volume percent can be delivered to the patient by maintaining a substantially fixed relationship between the total pressure in the vessel and the saturation partial pressure of the anesthetic liquid. According to the invention, this substantially constant relationship is maintained by a temperature responsive element in the vaporizing vessel which is responsive to changes in temperature in the vessel and a pressure regulator in the supply conduit for changing the pressure in the vessel in accordance with the changes in temperature.

The relationship between the temperature and the pressure can be adjusted so that within the range of normal operating conditions, the total pressure in the vessel will be held at a value which always approximates a fixed multiple of the vapor pressure of anesthetic liquid. Within this range, so long as this fixed relationship is maintained, the volume percent of the anesthetic liquid in the delivery conduit will remain the same regardless of changes in temperature in the vessel.

In conjunction with the foregoing, an important aspect of the invention is the provision of a regulator in the delivery conduit which provides for a constant delivery pressure. Given a known concentration of vapor and known delivery pressure, a measured flow to the patient can be provided by suitable flow control equipment.

The foregoing will become clearly apparent upon reference to the following detailed description of the invention, when taken in light of the accompanying drawings in which.

Figure 5:
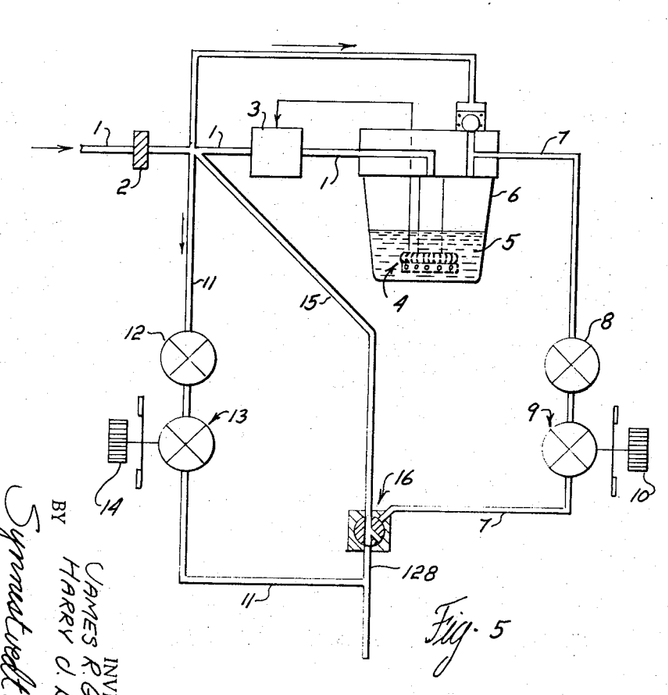
FIG. 5 is a schematic view of the invention.

For purposes of orientation, attention is first directed to FIG. 5 which illustrates in schematic form the general layout of one preferred form of apparatus embodying the invention. This preferred form includes a supply conduit 1 which is adapted to be connected to a suitable supply of carrier gas, typically oxygen. Conduit 1 is provided with a filter 2 for the purpose of screening out impurities. A means for regulating the pressure comprising a controller 3, described in detail hereinafter, is located in the line 1. Line 1 leads from the controller to a gas distributor 4 which is submerged in a supply of liquid anesthetic 5 in a vessel or jar 6.

As will be described more particularly hereinafter, the distributor is designed so that it will diffuse the gas in the form of small bubbles of the anesthetic liquid. The mixture of gas and anesthetic rises to the top of the liquid and passes out in vapor form through a delivery conduit 7 for delivery to the patient. A regulator valve 8 is located in the delivery conduit 7 and is preset to maintain the pressure on the downstream side of the valve at a level somewhat below the normal range of pressures in the vessel 6. Valve 8 is normally preset at the factory and need not ordinarily be adjusted once the unit is placed in operation.

A second valve 9 is located in the delivery line 7. The valve 9 is a variable flow valve and is provided with a knob 10 which the anesthetist can use to regulate the rate of flow.

According to one embodiment of the invention, a first bypass line 11 is connected to the oxygen supply line 1 at a point immediately downstream from the filter 2. The pressure in line 11 is regulated by a presettable valve 12 which is set in advance to ensure that oxygen will only flow through the line when at a pressure above a predetermined minimum. Downstream of the pressure valve 12 is an adjustable flow control valve 13 which can be set to the desired rate of oxygen flow by the operator by means of a knob 14. Valve 13 is typically a needle valve and is provided with a suitable indicator so that the operator can accurately select the rate of flow of oxygen in the line.

A second bypass line 15 is also connected to the supply line 1 on the downstream side of the filter 2. Line 15 and line 7 each lead to a valve 16. As will appear hereinafter, valve 16 is movable from a position in which flow is blocked both from line 15 and line 7 to alternative positions in which flow is permitted either from line 7 or line 15 to line 17 which leads from the valve 16. A connection is provided between the lines 11 and 17 at a point downstream from the valve 16.

Assuming that valves 9 and 13 are open and valve 16 is in the position in which flow from line 15 is blocked, a mixture of the anesthetic vapor and oxygen will flow through line 7 to the line 17. Pure oxygen at a predetermined rate of flow will flow to line 17 from the line 11 and will mix with the oxygen-anesthetic vapor mixture flowing from line 7. Since the rate of flow in both lines 7 and 11 is known, it is a simple matter for the anesthetist to calculate the combined rate of flow.

If it becomes necessary for the patient to receive a dose of pure oxygen, the anesthetist operates the valve so that line 7 is blocked. When the valve is in that condition pure oxygen from the supply line 1 flows through line 15 to the patient at supply pressure.

Figures 1, 2:
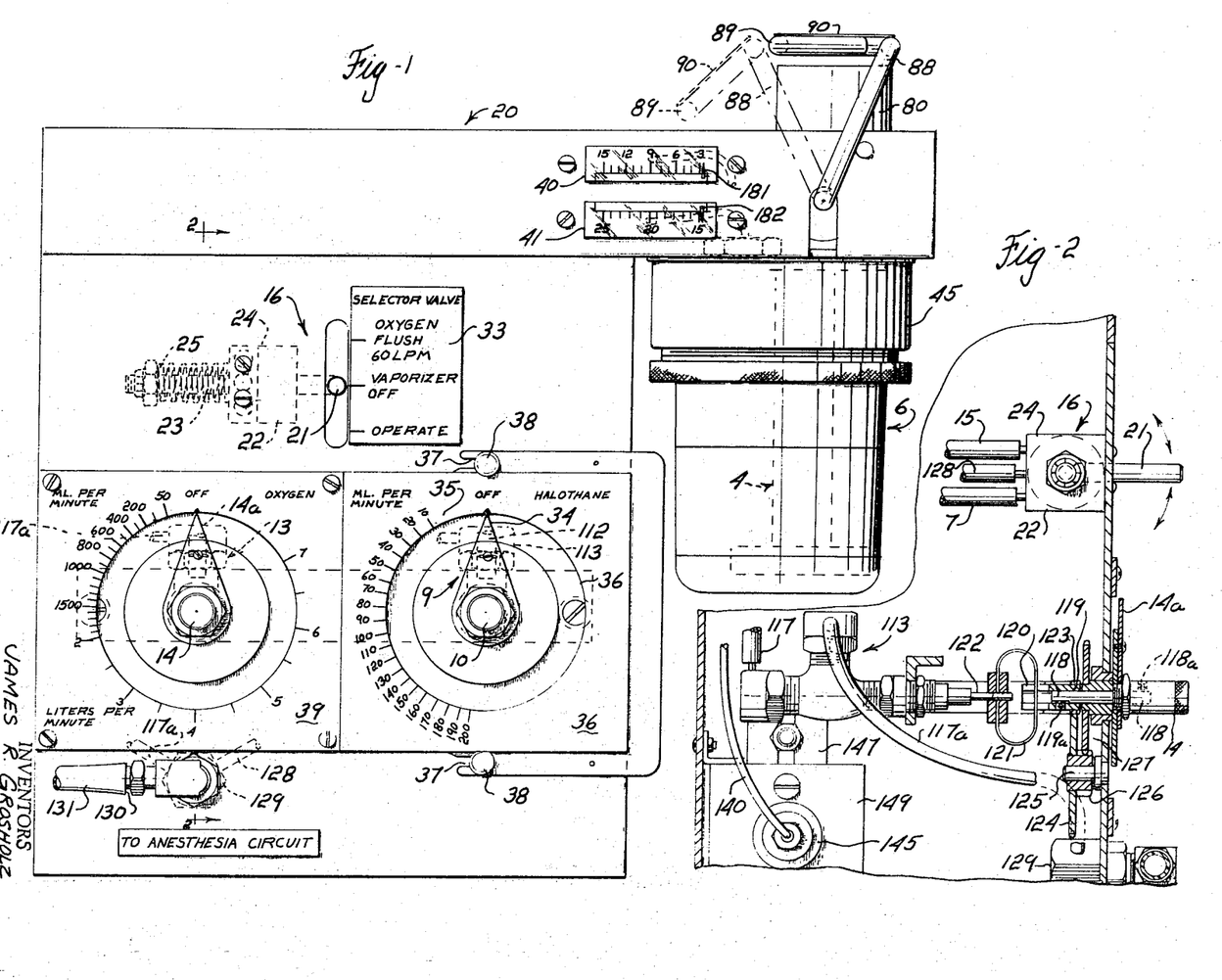
FIG. 1 is an elevational view of one preferred embodiment of the invention.
FIG. 2 is a sectional fragmentary view, taken along line 2—2 of FIG. 1.

Attention is now directed to FIG. 1 for a detailed description of the form of apparatus described generally above. The vaporizer apparatus is housed in a casing indicated generally by the numeral 20 on one sidewall of which are arranged various controls which the anesthetist will wish to operate during the administration of anesthesia. These will now be described.

The first is the control for selector valve 16 which includes a selector valve operating handle 21. Handle 21 rotates a movable valve member 22 which is secured to a shaft 23 which is in turn journalled for rotation in a stationary valve body 24. A compression spring 25 urges shaft 23 to the left as viewed in FIG. 1 in order to maintain an airtight seal between the movable and stationary portions of the valve. Handle 21 is movable by the anesthetist from a central position in which the vaporizer is off, to a lower position in which a flow path from line 7 through the valve members is established, so that anesthetic is delivered to a patient, or to an upper position in which a flow path is established from line 15 through the valve members so that a supply of pure oxygen can be administered. Appropriate legends shown in FIG. 1 are inscribed on a control plate 33 secured to the casing alongside the arm 21.

Anesthetic flow control knob 10 is mounted on the control panel below and to the right of the selector valve 16. The control knob 10 is provided with an indicator pointer 34 and operates the variable flow regulating valve 9 to regulate the flow through the anesthetic supply line 7 (also see FIG. 5). The pointer 34 cooperates with a circularly extending scale 35 graduated in milliliters per minute of the particular anesthetic gas to be administered. In the case of halothane which is a liquid particularly well suited for anesthetic purposes and is thus selected for purposes of illustration, the graduations on the scale extend from 0 to 200 milliliters per minute of halothane in 10 milliliter increments.

Scale 35 is preferably inscribed on a generally rectangular plate 36. The plate has a central circular cutout 36a through which the knob 10 and indicator pointer 34 extend. The scale extends around the edge of this cutout so that it cooperates with the pointer.

A pair of laterally extending notches 37 are cut into stepped portions on the upper and lower side edges of the plate 36. Aligned mounting pins 38 are secured to the casing on either side of the plate. The notches 37 fit over the pins, thereby supporting the plate 36 when it is mounted in the proper position with respect to the pointer 34.

If desired and if local laws relating to anesthetic equipment permit, the reverse side of the plate 36 may be provided with a second scale graduated in milliliters per minute of a different anesthetic gas (for example, methoxy fluorane) which will commonly be administered. When the vaporizer is used for vaporizing the second anesthetic liquid, the plate is simply removed, turned over and remounted on the pins 38. When other liquids are to be vaporized, other plates graduated in flow rates for the other anesthetic vapors may be substituted for plate 36.

The means for regulating the flow of oxygen includes flow control knob 14 located next to the anesthetic flow control knob 10. The knob 14 operates needle valve 13. The knob is provided with an indicator pointer 14a. A scale plate 39, having a circular opening 39a fits over the knob and pointer. A scale, graduated in milliliters and liters of oxygen per minute, surrounds the circular opening and cooperates with the pointer 14a.

Also positioned on the front of the casing 20 is a pressure gauge 40 graduated in pounds per square inch and a temperature gauge 41, the latter being graduated in degrees centigrade. The pressure and temperature gauges are connected to suitable detectors within the vessel 6 and provide a continuous indication of the pressure and temperature therein.

Figures 3, 4, 4A:
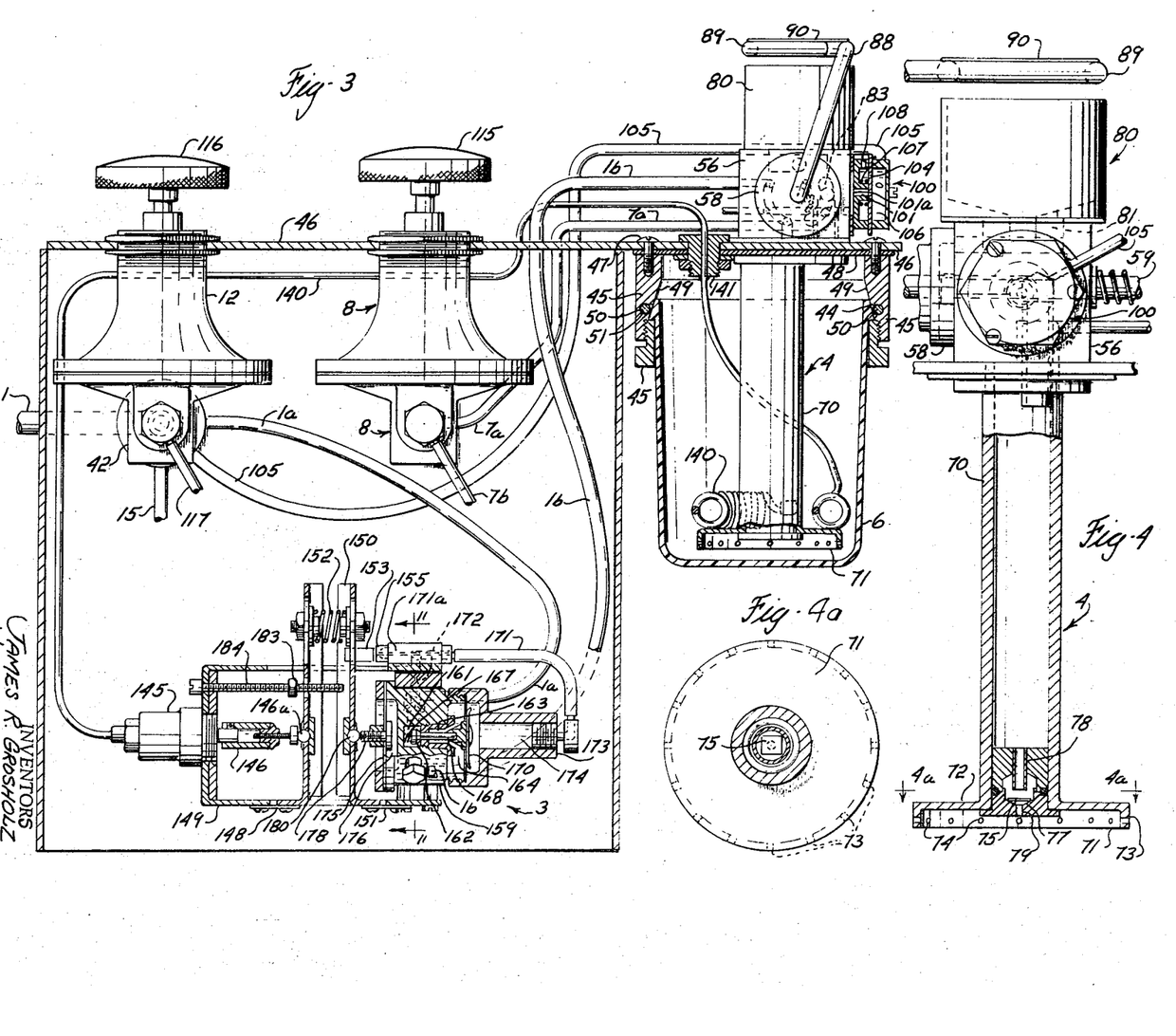
FIG. 3 is a sectional view, similar in orientation to FIG. 1, with the casing of the apparatus removed for clarity of illustration.
FIG. 4 is a view on an enlarged scale with respect to FIGS. 1—3, showing the gas diffuser and certain portions of the valving leading to the diffuser.
FIG. 4a is a sectional view taken along line 4a—4a of FIG. 4.

Attention is now directed to FIG. 3 which illustrates the interior of the housing with certain portions removed for purposes of clarity. Oxygen is supplied to the vaporizer from any suitable source of oxygen under pressure, through the oxygen supply conduit 1, to a manifold 42. A portion of the supply conduit 1, designated 1a, leads from the manifold 42 to the pressure controller 3, shown in FIG. 3 and also shown somewhat more schematically in FIG. 6. A portion of the supply conduit designated 1b, leads from the pressure controller 3 to vessel 6 which holds the supply of anesthetic liquid and in which the vaporizing action is to take place.

Operation of the controller 3 will be described more fully hereinafter. For the present, it should be understood that controller 3 is provided with a valve which varies the flow through conduit 1 to the vessel 6 in response to vessel temperature changes.

The vaporizing vessel or jar 6 is best shown in FIG. 3. The vessel is preferably formed of a transparent or translucent plastic material and is mounted outside of the casing so that it can be observed by the operator and the presence of anesthetic liquid detected.

A frustoconically shaped flange 44 is provided around the outside of the mouth of the vessel 6. A ring-shaped sleeve 45 is bolted to a horizontally extending frame member 46 by means of machine screws 47. A gasket 48 should be sandwiched between the sleeve and the frame plate to ensure that there is an airtight seal at the top of the vessel throughout the range of operating pressure to be encountered.

The internal wall portion of ring 45 is tapered as shown at 49 so that the flange 44 will fit snugly within it. A gasket ring 50, formed of a soft resilient material such as neoprene rubber, fits in an annular groove 51 machined into the tapered wall 49. Collar 52 fits over the vessel and is provided with external threads which cooperate with threads on the sleeve 45. The collar threads onto the sleeve, thereby wedging the flange 44 into tight engagement with the tapered wall 49 and the ring 50.

A valve assembly 55 is mounted on top of the plate 46. The valve assembly, also shown in FIGS. 7 through 10, includes a stationary valve body 56 and a rotatable control member 58. A number of passageways are formed in the stationary valve body which terminate in ports on a face 57 (see FIG. 7). The rotatable valve control member 58 is fixedly mounted on a shaft 59 adjacent face 57, the control member being superimposed on the body in phantom lines in FIG. 7 for purposes of illustration. The shaft is journalled for rotation in a bore 60 in the stationary valve body. The face of control member 58 next to face 57 is provided with a plurality of arcuately shaped passages shown in dotted lines in FIG. 7.

Figure 7:
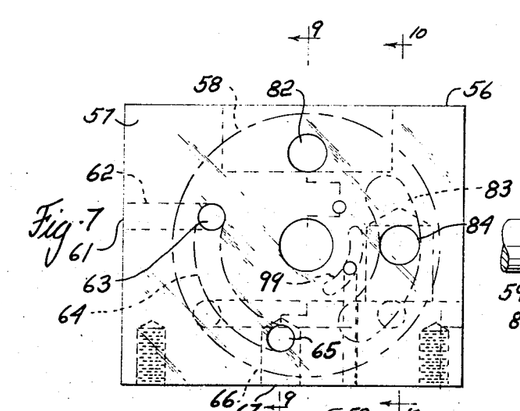
FIG. 7 is an elevational view on an enlarged scale, showing one face of the distributing valve for the anesthetic liquid vessel.
Figure 8:
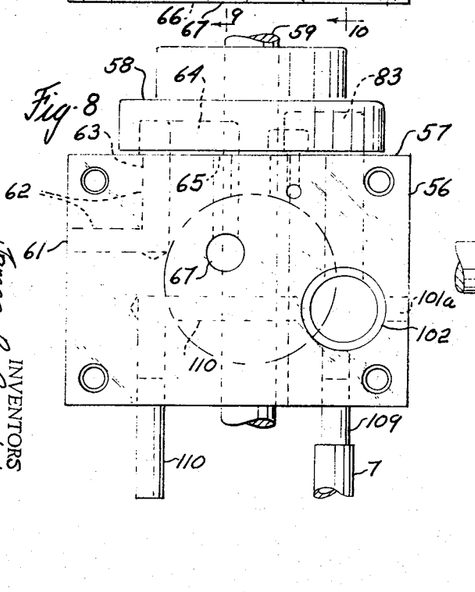
FIG. 8 is a view of the valve of FIG. 7 looking upwardly from beneath the valve housing.
Figures 9, 11:
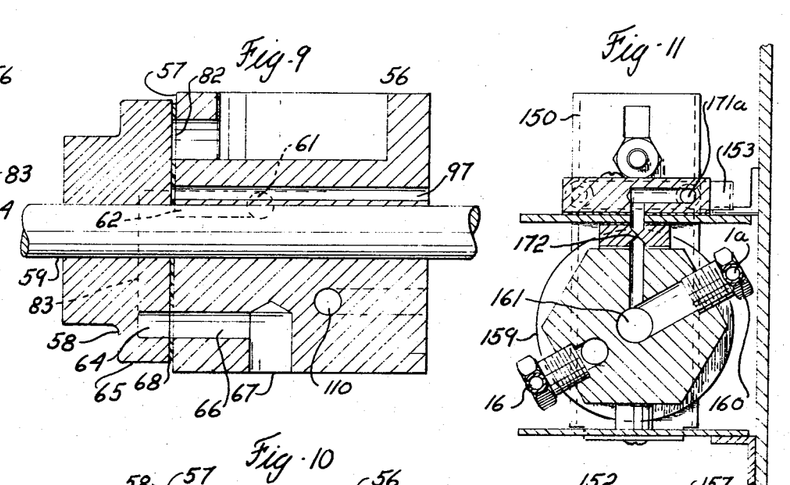
FIG. 9 is a sectional view taken on line 9—9 of FIG. 7.
FIG. 11 is a sectional view on an enlarged scale of the controller when taken on line 11—11 of FIG. 3.

A thin sheet of gasket material 68 is secured to the face 57 of the valve control member 58. Gasket material 68 may be formed of polyethylene or other materials having a relatively low co-efficient of friction to provide for a fluid-tight seal and yet permit relative movement between the control member 58 and the stationary valve body 56. In different positions of the control member, selected arcuately shaped passageways connect selected ones of the ports in the valve body. The details of these passages and the operation of the valve will be described in detail in various portions of the description which follow:

Oxygen line 1b is connected to a port in the valve body indicated in broken lines and identified by the number 61 in FIGS. 7—9. Port 61 leads into a passageway 62 which terminates in a port 63 on the face 57. The face of control member 58 is provided with a first arcuately shaped groove or passageway 64 which provides communication between the port 63 and a port 65 of a passageway 66. Passageway 66 exits from the bottom of the valve body through a port 67 which leads into vessel 6 is through the distributor 4. From the foregoing, it should be apparent that rotation of the control member 58 to or away from the position shown in FIGS. 3, 7, 8 and 9 provides for the admission or shut off of oxygen to vessel 6.

The distributor for introducing the oxygen into the anesthetic liquid is located inside the vessel 16 and is best shown in FIGS. 3, 4 and 4a. Distributor 4, shown in section in FIG. 4, is comprised of a tubular conduit section 70 which is secured to frame plate 46. A diffuser 71 is mounted at the end of the tubular portion near the bottom of the vessel so that it is always submerged in the supply of anesthetic liquid. Tubular conduit section 70 is positioned so that it covers the port 67 of the valve body 57. Diffuser 71 is provided with outwardly extending wall portions 72 and a downwardly extending rim 73 in which small holes 74 are circumferentially distributed.

A check valve structure 75 is mounted at the lower end of tubular section 70 and is provided to control the direction of flow in the system. The valve includes a check disc 75 which is positioned to rest on a frustoconical seat 77. Disc 75 is preferably rectangularly shaped (see FIG. 4a) although any shape will permit flow between the seat and the disc when the disc is at rest will suffice. As may be seen in FIG. 4, a tube 78 has a relatively small diameter with respect to the diameter of the main conduit section 70 of the distributor, is mounted directly above disc 75. The diameter of the tube is small enough so that when the check disc 75 is moved upwardly, it covers the lower end of the tube.

Under normal operating conditions, oxygen flowing through the conduit section 70 of the distributor passes through the tube 78 around the sides of the rectangularly shaped disc 75 and through a passageway 79 to the interior of the diffuser 71. This oxygen sweeps across the surface of the anesthetic liquid immediately beneath the diffuser and passes through the holes 74 as a stream of small bubbles which arise to the surface of the liquid.

If, for any reason, the pressure in the oxygen supply line upstream of the check disc 75 falls below the vessel pressure, as for instance if the line to the oxygen supply tank is accidentally disconnected, the relatively lower pressure upstream from the disc will result in an immediate upward movement of the disc until it covers the lower end of the tube 78, thereby preventing the back flow of anesthetic liquid into the oxygen supply line from whence it might escape to the surrounding atmosphere, possibly overcoming the attendants in the operating room.

The jar or vessel 6 is filled with anesthetic liquid by means of a fill receptacle 80 which is mounted on top of the valve body 55. To prevent spillage of the liquid as it is being poured, the fill receptacle has an enlarged mouth and should be somewhat funnel-shaped as is best shown in broken lines in FIG. 4.

A passageway 81 leads from the bottom of the receptacle and terminates in a port 82 in the face 57 of the valve body 56 (see FIGS. 7 and 9). A second arcuately shaped recess 83 is cut into the control member 58 and establishes communication between the port 82 and a port 84 in the face of the valve body. The port 84 leads into a passageway 85 which is connected to a downwardly extending tube 86 which terminates inside of the reservoir. The orientation of the arcuate grooves 64 and 83 is such that when the block is moved to the position in which communication between the ports 63 and 65 is established to permit oxygen to flow into the vessel, there is no communication between the ports 82 and 84. Conversely, when it is desired to fill the vessel with anesthetic fluid, ports 82 and 84 are connected by arcuate groove 83 and flow is cut off between ports 63 and 65.

In order to operate the valve, the end of shaft 59 is bent upwardly to form an operating handle 88. The upper end 89 of the handle 88 forms a circular loop which extends in a substantially transverse plane over the fill receptacle 80. A flat plate 90 is secured to the end portion 89 so that the fill receptacle is covered when the operating handle 88 is in the position shown in full lines in FIGS. 1 and 3. In that position, oxygen will be delivered to the interior of the vessel through line 1, port 61, line 62, port 63, line 64, port 65 and line 66 (see FIG. 7—9). There is then no communication between the ports 82 and 84.

When it is necessary to fill the vessel, the attendant moves the operating handle to the position shown in broken lines in FIG. 1. In this position, the oxygen flow is cut off and flow is established from the fill receptacle 80 to the interior of the vessel.

Because of the cover 90 which is attached to the handle, the fill receptacle 80 cannot be filled until the valve is in the position in which the vessel is disconnected from the pressurized oxygen supply. Without the cover, if the receptacle was filled with the vessel under pressure, movement of the valve to the position in which communication was established to the jar would allow oxygen to escape spraying any anesthetic liquid remaining in the vessel into the atmosphere.

Figure 10:
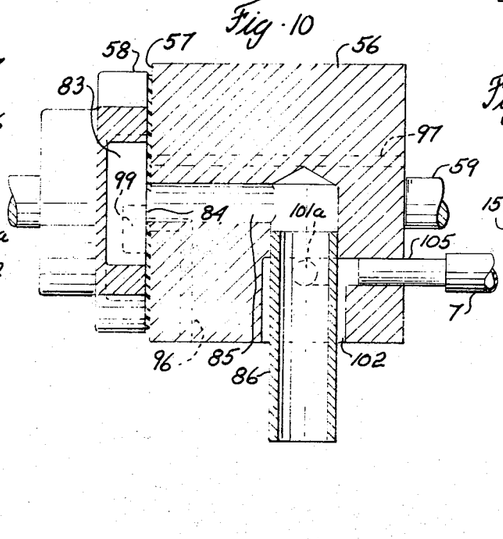
FIG. 10 is a sectional view taken along line 10—10 of FIG. 7.

When the valve is in the position in which the fill receptacle communicates with the interior of the vessel, a vent passage is established from the vessel to atmosphere thereby venting the vessel and thus producing a more even and rapid flow of liquid through the fill line. The vent passage includes a line 96 in the valve body which extends from the reservoir to the face 57 of body 56 (FIG. 10). A second line 97 extends from face 57 to a port 98 which is in communication with the atmosphere. A crescent shaped passage 99 in the controller 58 connects passageways 96 and 97 when the controller is moved to the position in which fill receptacle 80 is connected to the reservoir.

We have also found it desirable to provide means for depressurizing the vessel 6 in the event that oxygen in the supply line 11 drops below a predetermined pressure, for instance, when the bottled gas supply is exhausted or in the event of a break in the supply line. In order to accomplish this, a dump valve indicated at 100 in FIG. 3 is mounted on one side of the stationary valve block 56.

Dump valve 100 includes a valve port 101 which is in communication with the inside of the vessel 6 through a line 101a which leads to an annular passageway 102 (FIGS. 8 and 10) surrounding the fill tube 86. A diaphragm 104 is mounted on top of port 101 and provides for opening and closing of the port as follows:

A line 105 leads from the manifold 42 to a chamber 106 which surrounds the side of the diaphragm 104 away from port 101. A spring 107 urges the diaphragm away from port 101. When the port is opened, communication with atmosphere is provided through a small port 108 on the side wall of the dump valve housing. The spring 107 is compressed upon the buildup of pressure in chamber 106 and whenever oxygen in the line 1 (and control line 105) is at the desired operating level, the port 101 is covered by the diaphragm.

Anesthetic vapor leaves the vessel through the annular passageway 102, a short passageway 109, and the line 7 as is shown in FIGS. 8 and 10. A second passageway 110 leading from the annular passageway provides communication with pressure gauge 40.

A portion of the line 7, designated 7a in FIG. 3, leads from valve 55 to the regulating valve 8, shown in detail in FIG. 3. As noted above in the discussion of FIG. 5, valve 8 is controlled by a knob identified by the numeral 115. The valve 8 is preset at the factory so that the pressure in the line 7 downstream from the valve 8 is maintained at a pressure below the range of pressures which will be present in the vaporizing vessel.

Under ordinary operating conditions with the vaporizer operating in a room having a temperature of about 70°F., pressures within the vaporizing vessel will vary from 15 psig to 3 psig when halothane is being vaporized. In that case, we have found that the valve 8 should be set so that the pressure downstream from the valve is maintained at about 2 psig. When dealing with other anesthetic liquids having markedly different vapor pressure curves, or when the unit is to be used where room temperature is considerably higher, it may be necessary to select a different pressure value for the downstream side of the line 7.

The portion of line 7 downstream from valve 8 (designated 7b in FIGS. 2 and 3) leads to a port 112 (shown in broken lines in FIG. 1) in the body 113 of the flow control valve 9. Flow control valve 9 is controlled by the anesthetist and is typically of the needle valve type. As noted above, knob 10 and indicator 34 are used to set the valve to precisely regulate the rate of flow of the vapor-laden gas in the line 7.

In the embodiment of the invention illustrated in FIGS. 1—12, pneumatic circuitry for mixing a further measured amount of oxygen with the mixture of anesthetic vapor and oxygen flowing from the vessel is provided. This is accomplished by means of the line 11, shown in the schematic view of FIG. 5, which bypasses the vessel 16. The line 11 leads from a manifold 42 (FIG. 3) to the oxygen pressure regulating valve 12 which is mounted on the frame plate 46 next to valve 9.

Valve 12, shown in FIG. 3, is identical in construction to valve 8 and is preset by means of a knob 116 to provide for a pressure on the downstream side of the valve which is somewhat below the lowest value for the range of operating pressures in supply conduit 1.

A portion of the line 11, designated 117 in FIGS. 2 and 3, leads from valve 12 to the oxygen flow control valve 13, the latter being best shown in FIG. 2.

Since oxygen flow control valve 13 and anesthetic control valve 9 are of identical construction, only the oxygen flow control valve will be described in detail.

This valve is shown in FIG. 2 and is regulated by the knob 14. Knob 14 is secured to a shaft 118 by means of set screw 118a. A sleeve 119 is fixed on the other end of the shaft by means of a set screw 119a. Sleeve 119 is provided with an axially extending slot 120. A coupling ring 121 made of spring steel is secured on the end of valve shaft 122 by means of a set screw and fits within the slot 120, providing a drive coupling between the two shafts. With the valve closed and the knob set at the "off" position, the coupling is made by merely rotating the coupling ring, then slipping it axially into slot 120 and then tightening set screw 118a. The need for careful structural alignment of the valve and knob parts is unnecessary with this coupling arrangement.

A pinion 123 is integrally connected to the sleeve 119. Pinion 123 meshes with a gear 124 mounted on a stub shaft 125. A pinion 126 is also mounted on the stub shaft 125 for rotation with gear 124 and drives a gear 127 secured to a sleeve which is mounted for rotation on shaft 118 and which has the indicator pointer 14a secured thereto. The gear train provides for about 10 revolutions of knob 14 to one revolution of pointer 14a, thus making it possible to space the milliliter graduations on scale 35 relatively far apart. The arrangement helps the operator in the accurate setting of the needle valve so that accurate regulation of the flow is achieved.

The portion of line 11 downstream from valve 13 is shown in FIG. 2 wherein it is designated 117a. In FIG. 1, a small portion of this line may be seen in broken lines leading from valve 13. This leads to a manifold 129 shown in FIG. 2 and also in broken lines in FIG. 1.

As noted in the foregoing discussion of the schematic view of FIG. 5, a second oxygen bypass line 15 leads from the supply line 1 to the selector valve 16. Valve 16 is provided with two inlet passages, one for the bypass line 15 and the other for the anesthetic line 7. To briefly review, the valve is controlled by the selector valve arm 21 which extends through a slot in the front of the casing and is movable from a central position to either an upper or lower position to establish communication from either line 15 or line 7 to line 128.

Line 128 leads to the manifold 129. A hose coupling member 130 mounted on the outside of the casing is connected to the manifold 129. A hose 131 is adapted to be fitted onto the coupling member and leads to an anesthetic distributing device.

The operation of the apparatus so far described will be briefly reviewed. The vaporizer vessel 6 is first filled with anesthetic liquid and the valve handle 88 is moved to the full line position shown in FIG. 1.

Line 1 is connected to a suitable supply of oxygen under pressure. A desired rate of flow of gas in lines 7 and 11 is calculated and needle valves 9 and 13 are set.

When the pressure in line 1 reaches operating level, dump valve 100 will close due to the pressure in line 105 which leads from line 1 to the top of the diaphragm 104. Oxygen under pressure flows now through the anesthetic liquid in the vessel 6 and out through the delivery line 7 to the selector valve, through line 128 to manifold 129, and through line 131 to the anesthesia circuit. At the same time, pure oxygen flows from the manifold 42 to valve 12, the line 117, through the needle valve 13 and the line 117a to manifold 129 where it mixes with gas flowing through line 128.

If the patient should require a dose of pure oxygen, arm 21 of selector valve 16 is moved from the "operated" position upwardly to the "oxygen flush" position (see FIG. 1). In this position, line 7 is blocked and pure oxygen is delivered to the patient through line 15, through the selector valve 16, out through line 128, through the manifold 129 and the line 131.

Attention is now directed to FIGS. 3, 6, 11 and 12 for a description of the preferred manner of maintaining the correct proportions of anesthetic and oxygen delivered through the anesthetic delivery line 7.

A temperature sensitive element 140 is located in the vessel 6 for the purpose of measuring the temperature of the anesthetic liquid in the vessel. The temperature sensitive element 140 typically comprises a capillary tube which leads into the vessel through a headed coupling sleeve 141. The body of sleeve 141 is threaded to receive a clamping nut 142 which holds the sleeve tightly in place on the frame member 46. The joint between the tube 140 and the sleeve 141 is sealed with solder or other suitable sealing material in order to provide an airtight joint.

The end of capillary tube 140 may be coiled as shown at 144 and surrounds the tubular portion 70 of the distributor 69. The capillary tube is filled with a liquid and communicates with a chamber (not shown) in a housing 145. A diaphragm which is movable in response to changes in volume of the liquid in the capillary tube forms one wall of the chamber. As changes in temperature vary the volume of the liquid in the capillary tube, the diaphragm displaces a deflector member 146 by absolute amounts.

The end of deflector member 146 bears against a ball or button 146a mounted on a beam 147. Beam 147 is secured by a sheet spring mounting plate 148 to a frame member 149.

A second beam 150 is also mounted in the frame 149 by means of a spring mounting plate 151. The two beams are urged by their spring mounts to a central position in which they are parallel to each other as can best be seen from FIGS. 3 and 6, and are interconnected by a coil compression spring 152 near their unsupported ends.

Figure 6:
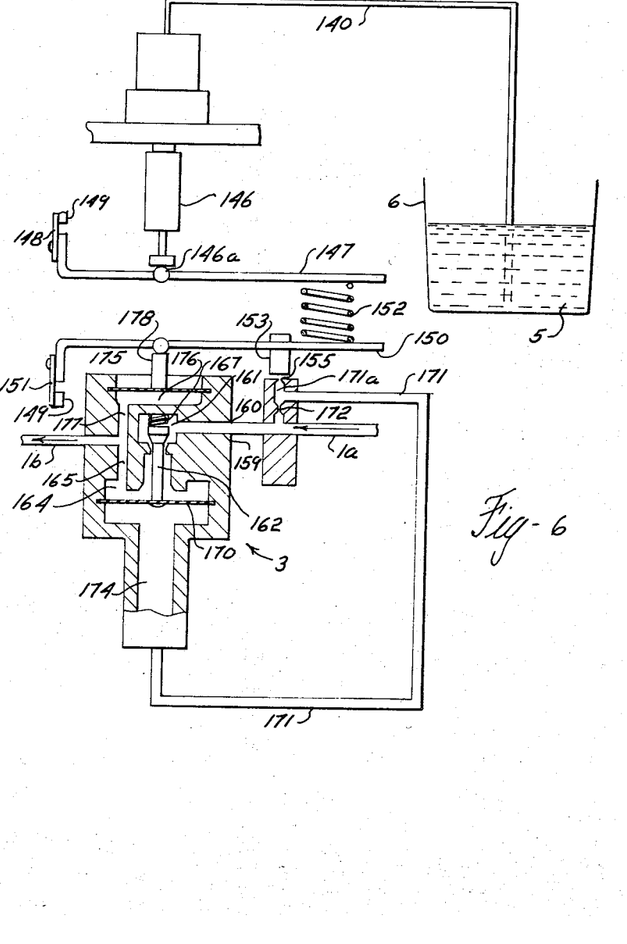
FIG. 6 is a schematic view of a preferred form of the pressure regulating means used in the apparatus of the invention.

Beam 147 is thus deflected upon displacement of member 146 and compresses spring 152 which in turn urges beam 150 in a clockwise direction as viewed in FIGS. 3 and 6.

Figure 12:
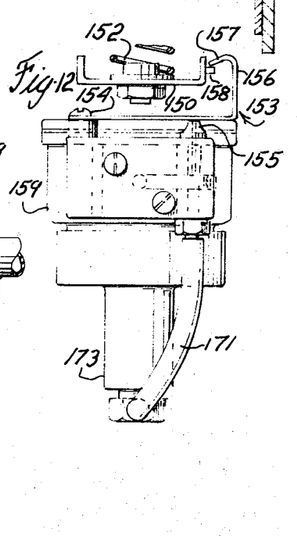
FIG. 12 is an elevation on an enlarged scale showing a portion of the pressure regulating means used in the present invention.

As shown perhaps most clearly in FIG. 12, a flapper 153, made of spring steel, is mounted by means of a machine screw 154, so that it ordinarily covers a nozzle 155. The flapper is formed with upright arm 156 having a bent over end portion 157. Bent over portion 157 lies in the path of a projection 158 which extends from beam 150. This projection engages the flapper and causes it to uncover nozzle 155 when the beam 150 is lifted. Clockwise deflection of the beam 150, as viewed in FIGS. 3 and 6 (downward deflection as viewed in FIG. 12) frees the flapper to move towards its position of rest in which it covers the nozzle 155. Conversely, upward or counterclockwise deflection of the beam 150 raises the flapper, moving it progressively further away from the nozzle 155.

The beams and nozzle are used to regulate the flow to the vessel in the following manner. The line 1a (FIGS. 3 and 6) leads into a regulating valve housing 159 through a housing port 160, shown in FIG. 11. The port leads to a valve chamber 161 in which a movable throttle valve member 162 is mounted. An annular outlet passage 163 leads from the inlet chamber around the movable throttle member into a lower valve chamber 164, the latter leading to outlet line 1b through a passageway 165 (FIG. 6). As noted above, line 1b communicates with the interior of the reservoir via the distributor 4.

It will be evident that the position of the throttle valve member 162 will determine the flow from chamber 161 through the annular passageway 162.

The means for positioning this valve will now be described. The valve member 162 is biased by means of a spring 167 to a position in which the passageway is closed and flow from line 1a to line 1b is blocked.

The valve member 16 is provided with an elongated stem 168 which is connected to and extends from the valve member to a flexible diaphragm 170. Diaphragm 170 forms one end wall of lower valve chamber 164.

A line 171 is connected to line 1a through a restricted passageway 172. A line 171a leads from line 171 to a port 155 as is best shown in FIGS. 3 and 6. Line 171 also leads to a bonnet 173 which encloses a chamber 174 on the side of the diaphragm 170 opposite to that of the valve stem 168.

A second diaphragm 175 forms one wall of a chamber 176. A passageway 177 connects chamber 176 with line 165.

A deflector member 178 is secured to the diaphragm 175. Deflector member 178 may be a threaded bolt-like rod, the threads of which cooperate with threads in a sleeve 179 secured to the diaphragm. The deflector member 178 bears against a button or a ball 180 which is mounted on the beam 150 at a point which is spaced from the beam 147 and the bearing point for its deflector member.

Assume first that the vessel is under pressure with a mixture of gas and vapor flowing to a patient, and that the beams are in a condition of equilibrium, that is, with the forces bearing against them being equal and opposite. In this position, flapper 153 has partially closed nozzle 155; the chamber 174 is pressurized and the pressure underneath the diaphragm 170 urges the valve 162 upwardly to the open position; pressure underneath diaphragm 175 causes deflector member 178 to urge the beam 150 towards the central position.

As the evaporation of liquid takes heat from the system comprising the vessel, the temperature will obviously drop, for example, 1°C., during an arbitrarily selected interval of time. This drop in temperature causes the fluid in the temperature responsive element to contract, raising deflector member 146 and decreasing the force on beam 147. At this instant in time, the moment on beam 150 will exceed the moment on beam 147, so that beam 150 will deflect upwardly, moving the flapper away from the nozzle 155. Pressure in line 171 and in chamber 174 will now drop since gas is exhausted more rapidly through nozzle 155 than it is supplied through restriction 172.

This drop in pressure in chamber 174 permits valve 162 to drop, due to the imbalance of pressure on the diaphragm 170. Flow from line 1a to 1b is reduced. Because of the reduced flow, pressure on the underside of diaphragm 175 drops and beam 150 moves downwardly. Assuming that no further change in temperature takes place, a new condition of equilibrium will be reached, and flapper 153 will assume a new position with respect to nozzle 155.

Because the vaporization of the volatile liquid anesthetic involves the loss of a substantial amount of heat from the system which comprises the vessel, a relatively large temperature drop can be expected during the course of administration of anesthesia, even though ambient temperature is relatively stable.

As a result of the operation of the controller, the fixed relationship between vessel temperature and vessel pressure will be maintained during this temperature change. Whenever a condition of imbalance of forces on the beams occurs, as when the temperature falls by a discrete amount, the controller will immediately react by reason of the changed position of the flapper with respect to the nozzle 155. The resultant drop in feedback pressure in line 171 allows controller valve 162 to close until a point is reached at which the beams are again in equilibrium.

The relationship between the total and partial pressures in the vessel will vary somewhat depending upon the volatility of the particular anesthetic liquid employed. When dealing with halothane, we have found it convenient to hold the total vessel pressure at a value which is about five times the saturation partial pressure of halothane, that is, from about 3 to 15 psig as the temperature varies from about 15°C. to 25°C. Thus, a satisfactory pressure can be maintained, even though the temperature in the vessel will drop by as much as 10°C.

It has also been found that the same range of vessel pressures works well for other anesthetic liquids such as ethyl ether, vinyl ether, chloroform, penthane, methoxy fluorane, all of which have similarly sloped vaporization curves within the range of pressures mentioned above.

In view of the fact that the controller maintains a linear relationship between total pressure and temperature as compared to the non-linear relationship between the partial pressure of the anesthetic liquid and temperature, it will be evident that with the embodiment described above an exact fixed relationship between total and partial pressures is not literally maintained. We have found, however, that as a practical matter, the variations are so small within the operating range of pressures, that they may be disregarded and for the purposes of this invention, a fixed relationship may be considered to be maintained. In fact, even though a controller could be provided having an output which is exactly patterned after the partial pressure curve, we prefer to use the linear controller for a variety of reasons, including the reliability, simplicity and economy of such a unit.

As noted above, pressure regulator 8, located in the downstream side of the vessel, is preset so that a constant pressure is maintained in the conduit 7. Likewise, the oxygen pressure in line 11 is established by the regulator 12. Given a constant concentration of anesthetic vapor and a constant delivery pressure, the rate of flow can be accurately regulated by means of the needle valves 9 and 13.

In order to give the operator a visual indication that the required relationship between total pressure and temperature is maintained, the pressure and temperature gauges 40 and 41 may be mounted in side-by-side relationship with their starting points in vertical alignment and with their scales laid out so that temperature and pressure pointers, designated 181 and 182, will be in alignment when the required linearity is maintained.

In fact, it should be stated that although we prefer to incorporate means for automatically maintaining the required fixed relationship between the total and partial pressure in the vessel, the controller for controlling total pressure in the vessel could be operated by hand when the temperature and pressure scales are oriented in the manner just described. All that is required is that the operator watch for variations from alignment and correct the supply pressure until the pointers are back in alignment.

Although temperatures below 15°C. within the vessel are considered unusual, it may be desirable to provide means to prevent vessel pressure from ordinarily dropping below 3 psi. This may be done by means of a nut 183 mounted on a bolt 184. Nut 183 limits upward movement of the beam 147 and thus prevents valve 162 from completely closing. While this results in a further departure from the desired relationship of temperature and pressure, in practice this departure is not great and the condition occurs so seldom that it is preferable to allowing the pressure to drop below the level at which control can be maintained.

Attention is now directed to the embodiment of the invention disclosed in FIGS. 13 through 16. Broadly considered, the embodiment of FIGS. 13 through 16 differs from that disclosed above in the elimination of the circuitry which bypasses the vaporizing vessel. In certain cases, as where a hospital has existing compatible equipment which is capable of delivering to a patient a measured flow of oxygen, the embodiment about to be described may be preferred.

Since several portions of the structure illustrated in FIGS. 13—16 are quite similar to that described above, the following portions of the description will center on those portions of the structure where differences exist.

Figure 13:
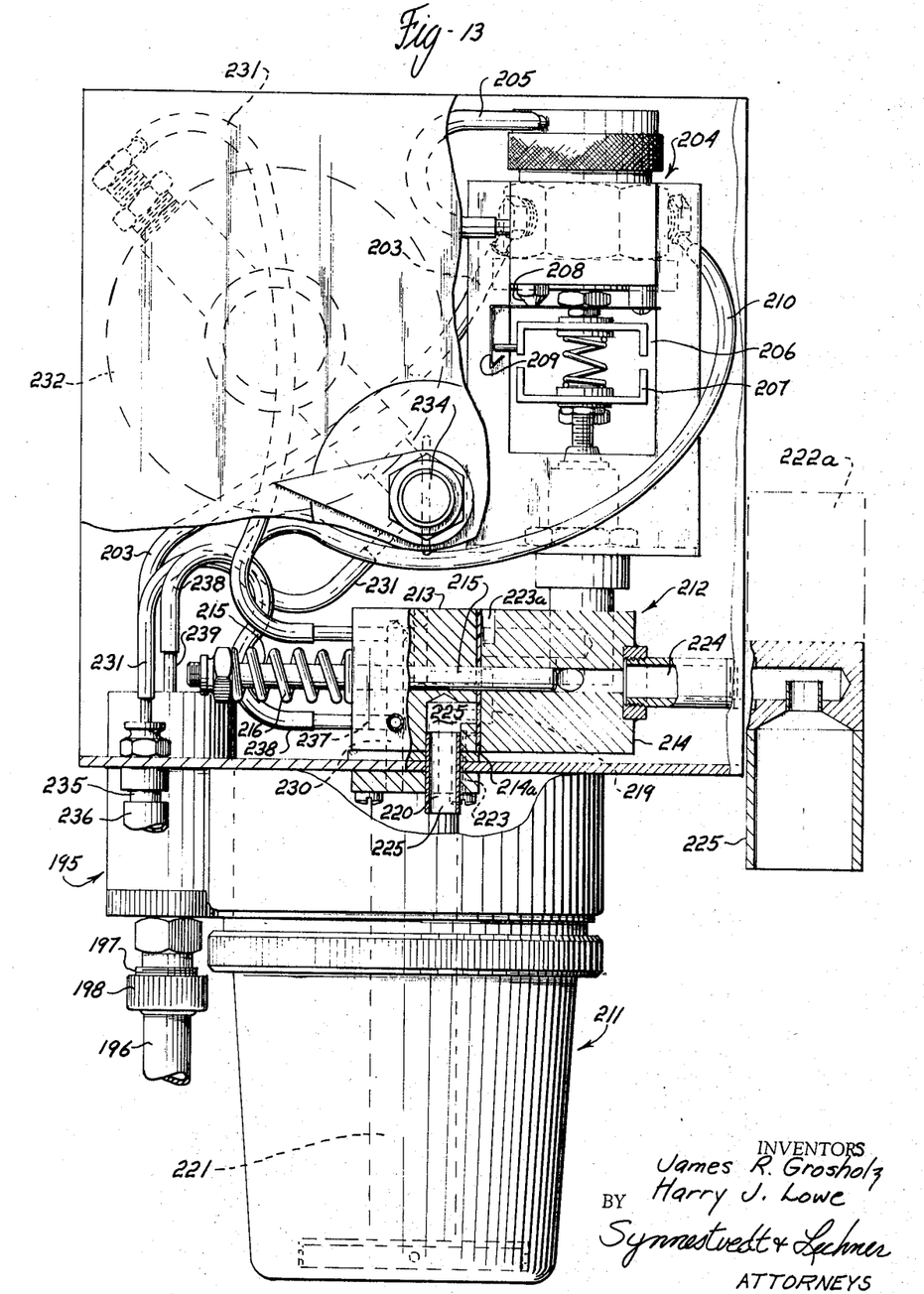
FIG. 13 is an elevational view, partly in section and with certain portions of the equipment removed for purposes of clarity of illustration, of an alternative form of equipment incorporating the principles of the present invention.
Figures 14, 15, 16:
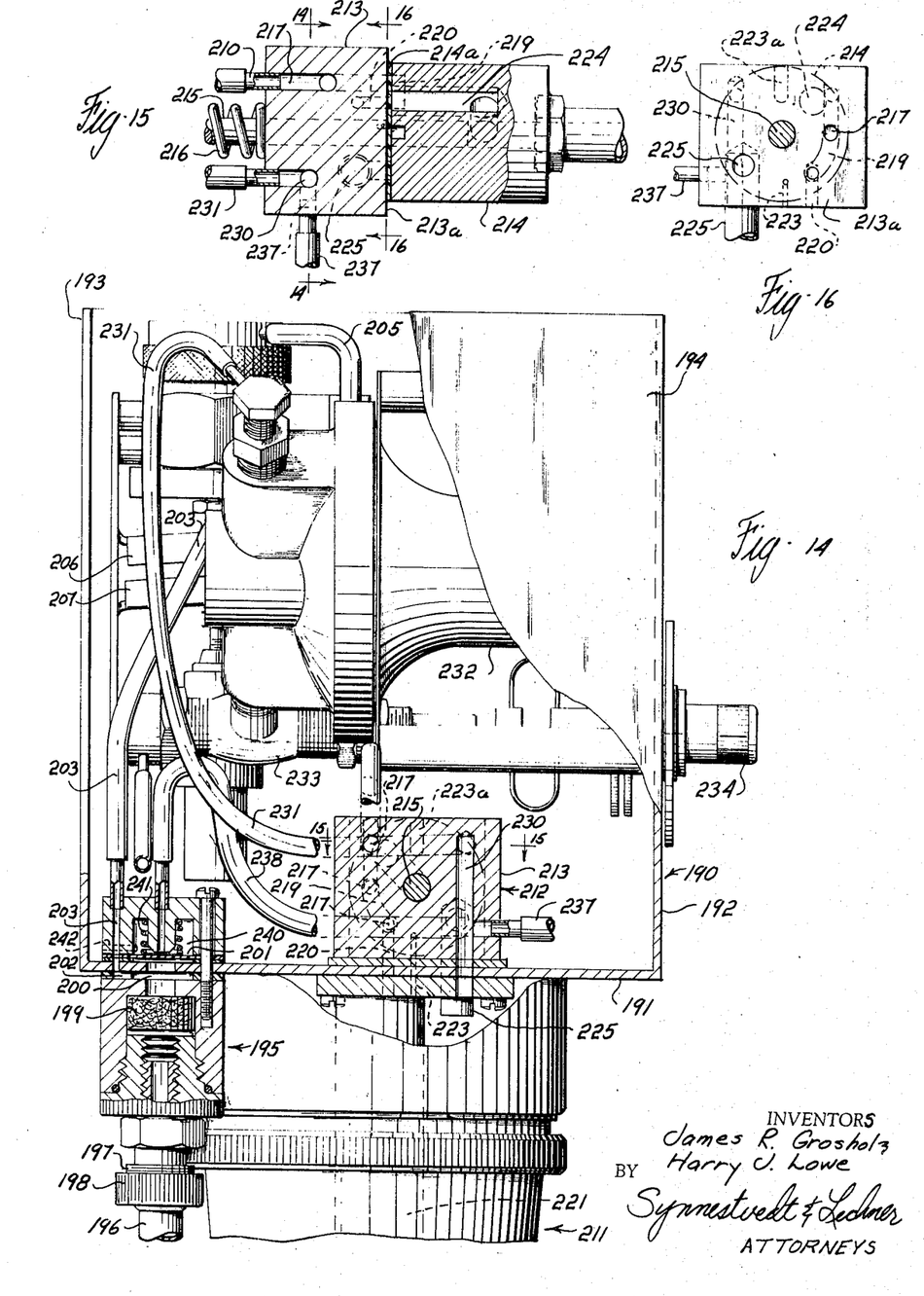
FIG. 14 is a side elevational view partly in section and with portions of the structure broken away of the embodiment of the invention shown in FIG. 13.
FIG. 15 is a fragmentary sectional view taken along line 15—15 of FIG. 14.
FIG. 16 is a fragmentary sectional view taken on line 16—16 of FIG. 15 showing the face of the valve structure illustrated in FIG. 15.

Turning first to FIGS. 13 and 14, the unit is mounted on a U-shaped frame member 190 which includes a transversely extending flat plate 191 and vertically extending flat plates 192 and 193, best shown in FIG. 14. A casing 194, most of which is broken away in the drawings, covers the U-shaped frame and protects the interior of the unit from damage.

An input valve assembly 195 is mounted on the bottom plate 191 on its left hand side as the unit is oriented in the FIGS. 13 and 14. An input line 196 is connected to the lower end of the valve assembly by any suitable means including a threaded nipple 197 and an internally threaded nut 198. The other end of line 196 is connected to a source of oxygen or other gas under pressure.

As is shown in section in FIG. 14, line 196 leads into a filter chamber which houses a filter 199 provided for filtering out any impurities which may have been entrained in the stream of oxygen.

A control chamber 200 is located in the valve on the downstream side of filter 199. The upper wall of the chamber 200 consists of a thin flexible diaphragm 201 whose function will be described hereinafter. A radially extending passageway 202 extends outwardly from chamber 200 and communicates with a line 203 leading to the top of the valve assembly and from there to the input connection of a temperature controller 204 shown in FIG. 13, the latter being substantially identical in design to the controller 3 shown in FIGS. 3, 6, 11 and 12 and considered in detail above.

Briefly reviewed, the controller includes a feedback line identified by reference character 205 in FIG. 13. The pressure in line 205 is varied by beams 206 and 207 which regulate the opening and closing of a nozzle 208 by means of a flapper 209. Depending upon the amount of pressure in the feedback line 205 which is regulated by action of beams 206 and 207 opening and closing port 209, the gas pressure transmitted from the controller will vary according to a proportional relationship with respect to the temperature in the anesthetic vessel.

A line 210 leads from an output connection on the controller to vessel 211 which holds the supply of anesthetic liquid. Line 210 enters the vessel through valve 212 which comprises stationary valve block 213 and a rotary controller member 214. The latter is pinned to a shaft 215 journalled for rotation in the stationary block 213. The stationary block 213 is provided with a plurality of passageways terminating in face 213a best seen in FIG. 16. Grooves cut in the complementary face 214a of the controller interconnect different sets of the passageways depending upon the position to which the controller is rotated. In FIG. 16, the face of the controller is superimposed on the face of stationary block in broken line form.

A coil spring 216 urges the shaft 215 and thence the rotatable valve part 214 to the left as viewed in FIG. 13, thus providing for a fluid-tight seal between the faces.

As shown in FIG. 15, line 210 is connected to a passageway 217 in the block 213. This passageway terminates in an opening on the face 213a of block 213. Movable valve member 214 is provided with a crescent shaped groove 219 which interconnects the passageway 217 with a passageway 220 leading away from face 213a and communicating with the interior of a gas distributor 221, which is substantially identical in configuration to the distributor described above in connection with the first embodiment. This path of communication is established when the movable valve member is in the position shown in FIGS. 13—16.

For filling purposes, we provide a funnel-shaped fill receptacle 222 shown in the inverted position in FIG. 13. Fill receptacle 222 is secured to the movable valve block 214 for rotation therewith through 180°. A stop 222a is positioned adjacent the receptacle in position to prevent movement of the receptacle beyond either its upright or inverted position. When it is necessary to fill the vessel, the receptacle, along with the valve block 214 is rotated 180°, so that it is in its upright position. In this position, the crescent-shaped groove 219 is out of alignment with the ports for the passageways 217 and 220, so that flow from the oxygen supply to the vessel is blocked. In the upright position of the fill receptacle, a breathing line 223 connects the interior of the vessel with the atmosphere through a groove 223a. Also a line 224 in the rotatable part of the valve is connected to a line 225 which leads to the interior of the vessel.

It will be observed that for the vessel to be pressurized, the funnel 222 must be in an inverted position for when it is moved to the upright position, the vessel will depressurize through the vent line 223, 223a. This makes it impossible for the operator to inadvertently pour anesthetic liquid into the funnel before the vessel 211 is depressurized, and eliminates the danger of spraying anesthetic liquid into the atmosphere if oxygen under pressure were allowed to escape through the passageway 224.

A line 230 in the valve block 213 connects the interior of the vessel with a flexible delivery line 231. Line 231 leads to a regulator valve 238 which is preset so that the vaporized anesthesia will only flow to the patient when at a pressure above a preselected minimum operating level.

The pressure regulator 232 is directly connected to an adjustable needle valve 233 which is identical in construction to the valve described above in connection with the first embodiment. A knob 234 provides for setting of the needle in order to regulate the flow of gas in the delivery line.

The side of the delivery line 231 downstream from the valve (FIG. 13) leads to a suitable output connector 235 which is adapted to be connected with a hose 236 which leads to the anesthetic administering equipment.

In order to shut off the unit if the supply pressure drops, a line 237 (FIGS. 13 and 14) in the valve block 213 branches off from line 230 to a port 239 (FIG. 4) in a chamber 240 and is connected by a tubing 238 on top of the diaphragm 201. A coil spring 241 urges the diaphragm downwardly away from the port 239. When oxygen within range of operating pressures is available in the line 196, diaphragm 201 is urged upwardly to cover the port. As the supply pressure drops below a predetermined minimum operating level, the diaphragm will move away from the nozzle so that flow takes place from the vessel into the chamber 240. A bleed line 242 establishes communication between the chamber 240 and atmosphere, so that the vessel will be vented to atmosphere whenever the diaphragm uncovers the port.

Although the operation of the second embodiment is substantially the same as that described above, this will be briefly reviewed.

When the vessel 211 is filled with anesthetic liquid and the input line 196 is connected to a suitable source of oxygen or other gas under pressure, the vaporizer is ready to operate. Oxygen will flow through the line 203, to the controller 204. The output of the controller is connected to the interior of the vessel through line 210 (FIG. 13), passageway 217 in the valve body (FIGS. 14–16), crescent-shaped groove 219 and passageway 220 (see FIG. 14). Oxygen bubbles through the liquid vaporizing the liquid and flows out through passageway 236 via pressure regulator 232 and flow control valve 233 to the patient.

It may be seen that each of the embodiments of the invention provides means for delivering a constant concentration of vapor, together with means for maintaining a constant delivery pressure. The combination of these two features permits accurate quantitative adjustment of the amount of vapor by adjustment of the calibrated flow regulating means. An important consequence of this arrangement is that the concentrations of vapor produced and the quantities delivered are substantially unaffected by external or internal system variables such as temperature changes, patients' lung pressures, or the like.

We claim:

1. In a system for delivering vaporized liquid anesthetic to a patient, a vessel for anesthetic liquid, means for supplying a carrier gas under pressure to said vessel including a conduit terminating in a gas distributor submerged in said liquid for bubbling the gas through the liquid, a delivery conduit leading from the vessel for delivering vapor-laden gas to the patient, and means for maintaining a constant volume percentage of anesthetic vapor in said delivery conduit comprising a temperature responsive element in said vessel and pressure regulating means controlled by said temperature responsive element for maintaining a substantially constant relationship between the total pressure in said vessel and the saturation partial pressure of said anesthetic liquid.

2. Apparatus according to claim 1, further including a pressure control valve in said delivery conduit for maintaining the pressure downstream from said valve at a fixed level below the range of pressures in said vessel.

3. Apparatus according to claim 2, further including a flow control valve in said delivery conduit for regulating the rate of flow of the mixture to the patient, said flow control valve being located at a point in said conduit downstream from said pressure control valve.

4. Apparatus according to claim 3, further including a bypass line connected to said carrier gas conduit, said bypass line being connected to said delivery conduit at a point downstream from said flow control valve.

5. Apparatus according to claim 4, further including a flow control valve in said bypass line.

6. Apparatus according to claim 4, further including a flush valve in said delivery conduit downstream from said flow control valve, means connecting said bypass line to the upstream side of said flush valve, and means for moving said valve from a first position in which communication is established between said vessel and the patient through said delivery conduit and a second position in which the delivery conduit from said vessel is blocked and communication is established between a supply of pure oxygen from said bypass line and the patient through the downstream side of the delivery conduit.

7. Apparatus according to claim 1, wherein said pressure regulating means includes a variable flow valve in said gas supply conduit and means controlled by said temperature responsive element for varying the flow through said valve in response to changes in temperature in said vessel, whereby the total vessel pressure is regulated.

8. In a system for feeding a mixture of a gas and a vaporized liquid anesthetic to a patient: a pressurized vessel for anesthetic liquid; means for supplying gas under pressure to the vessel including a supply conduit terminating in a destributor submerged in the liquid in said vessel for bubbling the gas through said liquid; a patient delivery line leading from said vessel; means for maintaining a constant volume percent of vapor in said patient delivery line including a temperature responsive element, and means for regulating the pressure in said vessel so that a substantially constant relationship between the total vessel pressure and the saturation partial pressure of the liquid is maintained; and a check valve in said supply conduit, said check valve being oriented to prevent the back flow of liquid through said supply conduit when the pressure in the supply conduit is below the pressure in the vessel.

9. Apparatus according to claim 8, wherein said check valve includes a frustoconical valve seat, having downwardly and inwardly inclining walls, a passageway leading from the center of said seat to the gas distributor, a valve disc resting on said seat, at least one peripheral edge of said disc being flat, the conduit on the upstream side of said disc including a port aligned with said disc, said disc being mounted for movement to close said port when the pressure downstream from said valve exceeds the pressure upstream from said valve.

10. Apparatus according to claim 8, further including a port at the top of the vessel communicating with atmosphere, a valve for closing said port, biasing means connected to said valve for opening the port and a pressure responsive means including a pressure control line communicating with said supply conduit for closing said port when the pressure in said supply conduit reaches a predetermined value.

11. In a system for delivering a mixture of vaporized anesthetic liquid and a carrier gas to a patient, a reservoir for anesthetic liquid, means for supplying gas to the reservoir including a conduit terminating in a gas distributor submerged in the liquid for passing the gas through the liquid, a delivery conduit leading from the top of the reservoir for delivering the mixture of vapor and gas to a patient, a flow control valve in said delivery conduit, and control means for maintaining a substantially fixed relationship between the saturation partial pressure of the liquid and the total reservoir pressure including a temperature responsive device for measuring the temperature in the reservoir and a variable flow control valve means in said supply conduit, said control means including means for adjusting said valve upon changes in vessel temperature whereby the vessel pressure is varied as a function of vessel temperature.

12. A system according to claim 11 wherein said control means includes a first control element connected to said temperature responsive device for producing an output signal proportional to the temperature in the vessel, a second control element producing an output signal proportional to the pressure in said vessel, said control means being operative to adjust said valve whereby the output signal of said first control element is maintained at a level equal to the output of said second control element.

13. A system according to claim 12, wherein said control means further includes first and second cantilevered beams, spring biasing means between said beams, said first control element bearing on said first beam and creating a movement proportional to the temperature of the vessel and operative to urge the first beam towards the second, said second control element bearing on said second beam and operative to urge said second beam towards said first beam with a force proportional to the pressure in the vessel, a control line leading from said supply conduit and having a port communicating with the atmosphere, a pressure responsive device responsive to changes in pressure in said control line, said pressure responsive device being connected to said valve for opening said valve when said port is closed and for closing said valve when said port is open, and a movable port closure member connected to said second beam and movable thereby for varying the flow through said port in accordance with the equilibrium positions of said beams.

14. A method of vaporizing anesthetic liquid comprising the steps of:
 filling a vessel with a supply of anesthetic liquid;
 passing a gas stream through the liquid in the vessel;
 maintaining the liquid in said vessel under pressure; and
 regulating the pressure in the vessel so that the total pressure in the vessel is held at a value equal to a fixed multiple of the saturation partial pressure of the liquid.

15. A method according to claim 14, further comprising the step of delivering the mixture of gas and vaporized anesthetic from said vessel to a patient, while maintaining the pressure of the mixture at a constant value below the range of pressures in the vessel.

UNITED STATES PATENT OFFICE
CERTIFICATE OF CORRECTION

Patent No. 3,528,418        Dated October 29, 1970

Inventor(s) James R. Grosholz & Harry J. Lowe

It is certified that error appears in the above-identified patent and that said Letters Patent are hereby corrected as shown below:

Column 11, Line 70 - after "oxygen" insert --to a patient--

Column 6, Line 15 - "frustoconical" should be --frustoconic--

Column 9, Line 12 - ""operated"" should be --"operate"--

Column 14, Claim 8 - Line 45 - "destribu-" should be
    --distribu- --

Column 14, Claim 9 - Line 59 - "frustoconical" should be
    --frustoconic--

Column 15, Claim 12 - Line 21 - "first" should be --second--

Column 15, Claim 12 - Line 23 - "second" should be --first--

SIGNED AND SEALED 1971

Febuary 2, 1971

(SEAL)
Attest:

Edward M. Fletcher, Jr
Attesting Officer

WILLIAM E. SCHUYLER, JR.
Commissioner of Patents